Dec. 26, 1939.    T. V. FOWLER ET AL    2,184,419
MANUFACTURE OF FERRIC SULPHATE
Filed April 6, 1938
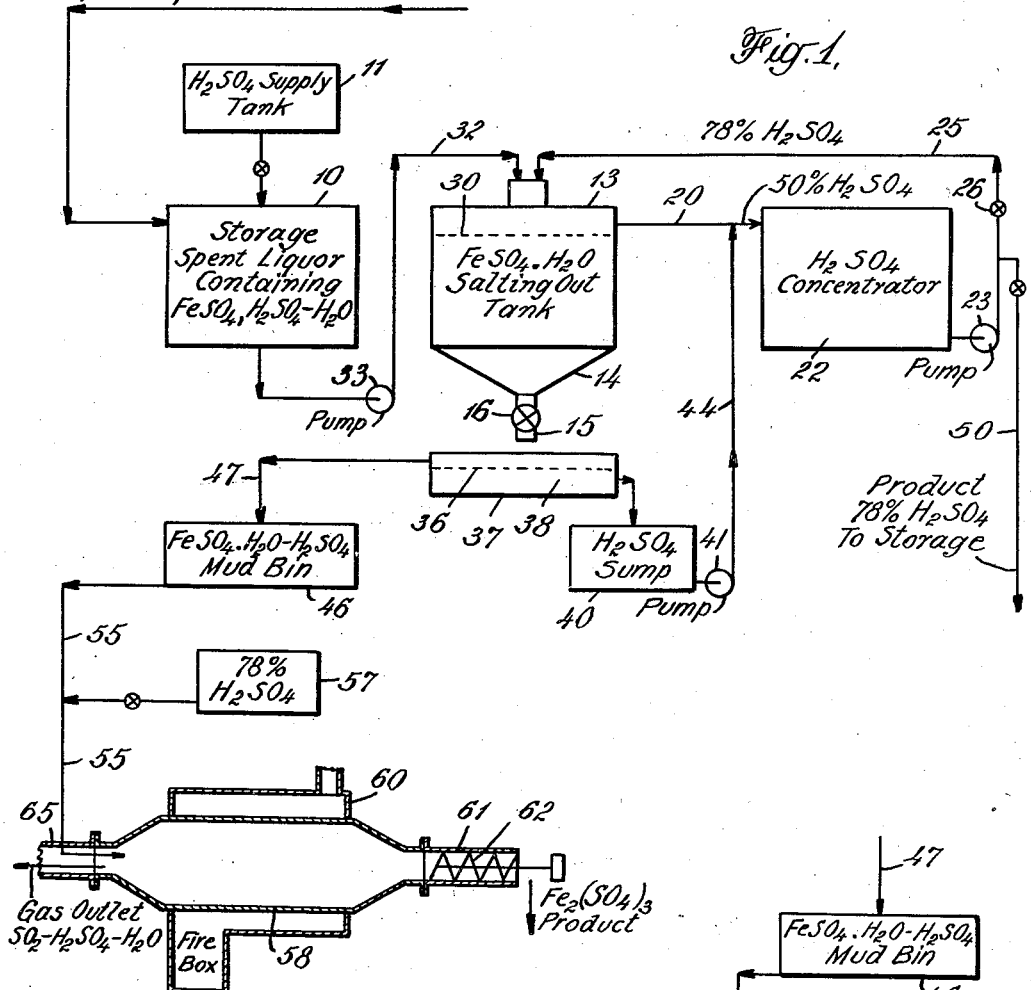
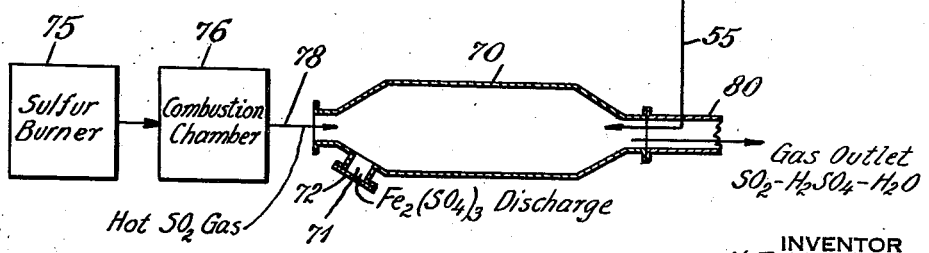
INVENTOR
H. F. Merriam
T. V. Fowler
BY
Joseph A. Ryan
ATTORNEY Patented Dec. 26, 1939

2,184,419

UNITED STATES PATENT OFFICE 2,184,419

MANUFACTURE OF FERRIC SULPHATE

Theodore V. Fowler, Pelham, N. Y., and Henry F. Merriam, West Orange, N. J., assignors to General Chemical Company, New York, N. Y., a corporation of New York Application April 6, 1938, Serial No. 200,386

2 Claims. (Cl. 23—126)

This invention relates to the manufacture of anhydrous ferric sulphate. More particularly, the invention is directed to methods for production of anhydrous ferric sulphate from aqueous sulphuric acid liquors containing ferrous sulphate, i. e. so-called "spent" sulphuric acid.

The invention, the objects and advantages thereof may be more fully understood from the following description taken in connection with the accompanying drawing in which Fig. 1 illustrates diagrammatically apparatus in which a preferred embodiment of the process of the invention may be carried out; and Fig. 2 shows diagrammatically a modified type of apparatus.

In the broader phases, the invention is directed to methods for production of anhydrous ferric sulphate by procedure involving introduction of ferrous sulphate, preferably in solid form as $Fe_2SO_4.H_2O$, into a reaction zone and heating or furnacing the ferrous sulphate, with sulphuric acid in amount at least sufficient to substantially completely oxidize the ferrous to ferric sulphate, at temperatures high enough to effect such oxidation but not above temperatures causing decomposition to ferric oxide of the ferric sulphate produced. Heating is continued, preferably while agitating the mass, for a period of time sufficient to substantially complete such oxidation and to form substantially dry anhydrous ferric sulphate. While with respect to these aspects of the invention, including furnacing the ferrous sulphate with sulphuric acid, the initial desirably solid ferrous sulphate may be that produced by any suitable method or derived from any satisfactory source, for reasons hereafter made evident, it is preferred to utilize ferrous sulphate obtained from spent ferrous sulphate containing sulphuric acid liquors such as spent pickling liquors and the ferrous sulphate-sulphuric acid liquors remaining after hydrolytic precipitation of titanium hydrate from titanium sulphate solutions. Waste liquors of this type contain variable but substantial amounts of ferrous sulphate and sulphuric acid. Hence, use of such liquors provides not only sources of all of the ferrous sulphate and part or all of the sulphuric acid needed in the present process but also provides for economic disposal of such liquors and for the recovery of the contained valuable constituents.

In accordance with the preferred embodiment of the invention, liquors containing ferrous sulphate and sulphuric acid are treated so as to bring about salting out of ferrous sulphate in the form of the monohydrate, $FeSO_4.H_2O$. The solid ferrous sulphate is separated in any suitable way from at least the bulk of the liquid from which salting out has been effected, and there is thus obtained a mass of solid $FeSO_4.H_2O$ containing a substantial quantity of adhering sulphuric acid, the amount of which depends largely upon the extent to which the acid liquor has been concentrated and upon the thoroughness of separation of monohydrate from mother liquor. The resulting sulphuric acid containing ferrous sulphate mass is introduced into a kiln and furnaced with sulphuric acid, preferably in amount not less than about 30% and not more than about 60% in excess of that theoretically required to oxidize the ferrous sulphate to ferric sulphate. Furnacing is carried out at temperatures high enough to effect the desired reaction and resultant oxidation but not above temperatures causing decomposition of the ferric sulphate produced. Heating of the mass is continued, while agitating, for a period of time sufficient to substantially complete oxidation and form substantially dry anhydrous ferric sulphate which is discharged as such from the reaction zone. During furnacing, the $SO_2$ and water vapor formed as a result of the ferrous sulphate-sulphuric acid reaction, and also vaporized sulphuric acid are withdrawn from the furnace and utilized in the manufacture of sulphuric acid.

While any ferrous sulphate liquor may be used in the present process, spent pickle liquors and spent titanium liquors constitute particularly satisfactory sources of ferrous sulphate and sulphuric acid. The composition of such liquors may vary widely. However, the following may be considered as representative:

|  | Spent pickle liquor | Spent titanium liquor |
|---|---|---|
|  | Percent | Percent |
| $FeSO_4$ | 25.0 | 12.0 |
| $H_2SO_4$ | 6.0 | 17.0 |
| Water | 69.0 | 71.0 |

Referring to the drawing, in carrying out the invention, liquor of the type referred to is run into storage tank 10. Some liquors may be deficient in sulphuric acid and in such case, for reasons subsequently explained, the needed further amount of sulphuric acid may be introduced into storage tank 10 from a sulphuric acid supply tank 11. Numeral 13 indicates a salter or salting-out tank having a closed top and a hopper bottom 14 terminating in a discharge pipe 15 controlled by valve 16. Opening into the salter near the top is an acid conduit 20, the opposite end of which discharges into the top of a sulphuric acid concentrator 22. Sulphuric acid is withdrawn from concentrator 22 by pump 23 and part or in some circumstances all of the acid is returned to the salter through a line 25 controlled by valve 26. As will hereinafter appear, in usual procedure concentrator 22 is controlled so that the acid withdrawn by pump 23 is relatively strong, of concentration say about 78% $H_2SO_4$.

In starting operations, salter 13 is filled with such acid up to approximately the level of dotted line 30. It has been found that where the concentration of the acid body in salter 13 is maintained at not less than about 50% $H_2SO_4$, practically all of any ferrous sulphate introduced is salted out as solid ferrous sulphate in the form of the monohydrate, $FeSO_4.H_2O$. Accordingly in carrying out the process, taking into consideration the composition of the specific liquor in tank 10 and the $H_2SO_4$ concentration of the acid in line 25, the amount of spent liquor from tank 10 continuously fed into salter 13 through line 32 by pump 33 and the amount of relatively strong sulphuric acid continuously run into the salter by pump 23 through line 25 are regulated so that the $H_2SO_4$ concentration of the resulting body of sulphuric acid in salter 13 does not fall below about 50%. Under these conditions $FeSO_4.H_2O$ rapidly salts out and settles into the hopper bottom 14, and sulphuric acid of $H_2SO_4$ concentration of about 50% or higher continuously flows through line 20 into the top of the concentrator 22. The latter may be of any standard construction, and is operated as known in the art to concentrate the acid to the desired extent, say about 78% $H_2SO_4$ as in the present example.

A sludge or thick mush comprising a mixture of $FeSO_4.H_2O$ and up to say 20 to 25% adhering sulphuric acid may be continuously or intermittently discharged from the salter through pipe 15 onto a suitable screen 36 in drainer 37. A substantial amount of acid leaves the salter in admixture with the $FeSO_4.H_2O$. A large portion of such acid collects in the drainer pan 38, flows into sump 40, and is run by pump 41 through line 44 into conduit 20 and thence returned to concentrator 22. Any suitable apparatus such as a centrifuge or filter may be used in place of drainer 37 illustrated on the drawing. Whatever type of apparatus is employed, it is preferred to operate the same so that the solid $FeSO_4.H_2O$ mass discharged therefrom and transferred to bin 46 by conveyor 47 is a readily manageable and not too fluid mass. As will hereinafter appear, it is advantageous to effect separation of $FeSO_4.H_2O$ and admixed sulphuric acid in such a way as to leave as much acid as possible adhering to the solid $FeSO_4.H_2O$. The controlling factor in this respect may be considered one of convenience, i. e. so that the consistency of the mud in bin 46 is such that the mass may be easily handled when preparing the same for the subsequent furnacing operation.

It will be seen that sulphuric acid is being continually removed from the salter-concentrator circuit in amount equivalent to that adhering to the solid $FeSO_4.H_2O$ collecting in bin 46. If the initial spent liquor fed into tank 10 contains sulphuric acid in quantity about the same as the amount of acid clinging to the $FeSO_4.H_2O$ in bin 46, it will be seen that the quantity of sulphuric acid in the salter-concentrator circuit will remain practically constant, no product acid will be withdrawn from line 50, and no further additions of extraneous acid from supply tank 11 need be made. However, if the liquor charged into tank 10 is deficient in sulphuric acid it will be seen that additions of sulphuric acid from tank 11 should be made from time to time. On the other hand, should the spent liquor in tank 10 contain sulphuric acid greater than that admixed with the $FeSO_4.H_2O$ in bin 46 such greater amount of acid may be withdrawn from the salter-concentrator circuit through line 50 as one product of the process. Such acid may be further concentrated if desired in apparatus not shown.

According to the invention it has been found that dry, anhydrous ferric sulphate may be made to commercial advantage by furnacing solid ferrous sulphate, preferably $FeSO_4.H_2O$, with sulphuric acid in amount necessary to effect commercially complete oxidation of the ferrous sulphate to ferric sulphate, at temperatures high enough to effect such oxidation but not above temperatures causing decomposition of the ferric sulphate thus produced, and continuing heating of the mass, preferably while agitating, for a period of time sufficient to substantially complete such oxidation and form substantially dry anhydrous ferric sulphate.

Ferrous sulphate reacts with sulphuric acid to produce ferric sulphate, sulphur dioxide and water in accordance with the following equation:

$$2FeSO_4 + 2H_2SO_4 \rightarrow Fe_2(SO_4)_3 + SO_2 + 2H_2O$$

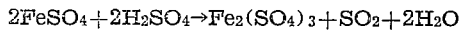

While in accordance with this equation one mol of ferrous sulphate theoretically reacts with one mol of sulphuric acid, it has been found that in order to obtain commercially satisfactory results, furnacing of the ferrous sulphate should be effected desirably in the presence of an appreciable excess of sulphuric acid. The invention contemplates furnacing ferrous sulphate with such an excess of sulphuric acid as is needed to obtain commercially satisfactory oxidation of ferrous to ferric sulphate. It has been found that to secure best results, ferrous sulphate should be furnaced with sulphuric acid preferably in amount not less than about 30% and not more than about 60% in excess of the acid theoretically required to oxidize the ferrous sulphate to ferric sulphate in accordance with the above equation.

On the drawing, numeral 55 represents any suitably constructed mixer-conveyor by means of which $FeSO_4.H_2O-H_2SO_4$ mass from bin 46 and additional sulphuric acid (if needed) from tank 57 may be mixed and introduced into rotary kiln 58. In most instances, the $FeSO_4.H_2O$ mass in bin 46 contains adhering $H_2SO_4$ in amount less than that needed in the furnacing operation. Hence, taking into account the quantity of $H_2SO_4$ present in the $FeSO_4.H_2O$ mass, mud from bin 46 and extraneous sulphuric acid, of strength say 78% $H_2SO_4$, from tank 57 are fed into mixer-conveyor 55 in proportions to form a mixture which when fed into kiln 58 contains $FeSO_4.H_2O$ and $H_2SO_4$ in amount providing the previously mentioned excess of $H_2SO_4$.

Kiln 58, shown diagrammatically in the drawing, may be rotatably mounted in furnace setting 60 provided with a fire-box and necessary equipment to facilitate maintenance of proper temperatures in the kiln. Furnacing of the $FeSO_4.H_2O-H_2SO_4$ mass in the kiln is controlled so as to heat the mass to temperatures high enough to effect the $FeSO_4-H_2SO_4$ reaction and resultant oxidation of ferrous sulphate to ferric sulphate but not above temperatures causing decomposition to ferric oxide of the ferric sulphate produced. Temperatures prevailing in kiln 58 may range from about 525° F. to not more than about 840° F.

The $FeSO_4.H_2O-H_2SO_4$ mixture is continuously fed into the kiln by conveyor 55, and reaction of $FeSO_4$ and $H_2SO_4$ proceeds with formation of ferric sulphate, sulphur dioxide gas, and water vapor. Some sulphuric acid is vaporized. The ferric sulphate formed is discharged from the kiln by means of a conduit 61 and associated conveyor 62, both of which may be constructed and operated so as to facilitate intermittent or continuous discharge of ferric sulphate from the kiln without permitting escape of gases and vapors from the kiln or admission thereto of atmospheric air. Feed of raw materials by conveyor 55, rate of rotation of kiln 58, temperatures maintained therein, and the rate of movement of solid material through the kiln are controlled so as to produce solid, dry, anhydrous $Fe_2(SO_4)_3$ which is continuously discharged as such by conveyor 62.

The sulphur dioxide gas and water vapor formed and the sulphuric acid vaporized are continuously withdrawn from the kiln through outlet 65. Such gases and vapors may be introduced into a wet purification plant such as shown for example in Herreshoff U. S. Patents 940,595 of November 16, 1909 and 1,113,437 of October 13, 1914, purified, and utilized in the manufacture of sulphuric acid.

While the furnacing operation has been described in connection with use of solid ferrous sulphate in the form of the monohydrate, $FeSO_4.H_2O$, it is possible to use solid ferrous sulphate in the form of $FeSO_4.7H_2O$. It is not particularly desirable, however, from a commercial viewpoint to use the seven water crystal since the presence in the kiln of the greater amounts of water creates furnacing difficulties and substantially cuts down production of ferric sulphate per unit of apparatus. Such disadvantages are not encountered when using the lower hydrate as in the preferred procedure.

The furnacing phase of the process of the invention may be practiced advantageously in conjunction with a contact sulphuric acid plant in which the sulphur dioxide used is generated by burning sulphurous material such as brimstone. This modification of the invention may be carried out in apparatus shown diagrammatically in Fig. 2 of the drawing.

When using the apparatus of Fig. 2, it will be understood that operation of the $FeSO_4.H_2O$ salting out phase of the process is the same as described in connection with Fig. 1. However, in the modified embodiment of the invention, the heat needed to bring about reaction of ferrous sulphate and sulphuric acid is furnished by directly contacting hot $SO_2$ gases with the $FeSO_4.H_2O-H_2SO_4$ mass. Referring to Fig. 2, 70 represents a kiln rotatably supported in bearings not shown. Ferrous sulphate mud from bin 46 and sulphuric acid (if needed) from tank 57 are fed in proper proportions into one end of kiln 70 by conveyor 55, the same as in the procedure of Fig. 1. The opposite end of the kiln is provided with an $Fe_2(SO_4)_3$ discharge opening 71 equipped with any suitable device 72 by means of which ferric sulphate may be discharged from the kiln without permitting ingress or egress of gases.

Numerals 75 and 76 indicate a sulphur burner and associated combustion chamber, both of which may be of standard construction. In burner 75 sulphurous material such as brimstone may be vaporized and partly burned and completely burned in combustion chamber 76 to produce an $SO_2$ gas containing say 10% $SO_2$, 11% oxygen, and 79% nitrogen and heated to temperatures of the order of say 1600–1800° F. The $Fe_2(SO_4)_3$ producing operation in kiln 70 is conducted the same as in kiln 58 of Fig. 1, except that the heat needed is supplied by directly contacting the reacting mass in the kiln with hot $SO_2$ gases introduced from line 78. While such hot $SO_2$ gases may be at temperatures around 1600–1800° F., the same temperature conditions, as in kiln 58 of Fig. 1, may be maintained in kiln 70 by control of the quantity of $SO_2$ gases fed in from line 78. Should the sulphur burner-combustion chamber unit be designed for relatively high capacity and passage of all of the $SO_2$ gases through kiln 70 create too high temperatures therein, part of the brimstone gas may be by-passed from line 78 around kiln 70 and into gas line 80, thus passing through kiln 70 only the amount of hot gas required to maintain the necessary temperature conditions therein.

The brimstone gases containing the additional $SO_2$ and water vapor formed in the ferrous sulphate-sulphuric acid reaction, and some vaporized sulphuric acid are withdrawn from the kiln in outlet pipe 80 through which the gases and vapors are conducted to a wet purification plant such as shown for example in the Herreshoff patents previously mentioned. This mode of operation presents the advantage that not only is the heat needed in the ferrous sulphate-sulphuric acid reaction obtained by extraction from waste heat from the brimstone gas, but further the $SO_2$ content of the brimstone gas ultimately delivered to the contact unit is augmented to the extent of the amount of $SO_2$ formed in the ferrous sulphate-sulphuric acid reaction. Other hot $SO_2$ gases, such as those produced by sulphide ore roasters of the hearth or suspension type, may be used in place of hot brimstone gas.

We claim:

1. The method for making anhydrous ferric sulphate which comprises furnacing solid ferrous sulphate, in contact with sulphuric acid in amount not less than 30% and not more than 60% in excess of that theoretically required to oxidize ferrous sulphate to ferric sulphate, at temperatures not less than 525° F. and not more than 840° F., and continuing furnacing of the mass, while agitating the same, for a period of time sufficient to substantially complete oxidation of ferrous sulphate to ferric sulphate and to form substantially dry anhydrous ferric sulphate.

2. The method for making anhydrous ferric sulphate which comprises furnacing, $FeSO_4.H_2O$ and sulphuric acid in amount not less than 30% and not more than 60% in excess of that theoretically required to oxidize the ferrous sulphate to ferric sulphate, at temperatures not less than 525° F. and not more than 840° F., and continuing furnacing the mass, while agitating the same, for a period of time sufficient to substantially complete oxidation of ferrous sulphate to ferric sulphate and to form substantially dry anhydrous ferric sulphate.

THEODORE V. FOWLER.
HENRY F. MERRIAM.